United States Patent
Silveira

(10) Patent No.: US 7,161,723 B1
(45) Date of Patent: Jan. 9, 2007

(54) SCHEME CAPABLE OF PROVIDING GAIN AND THRESHOLDING TO THE PARALLEL RECORDING AND REPLICATION OF HOLOGRAPHIC MEDIA

(75) Inventor: Paulo E. X. Silveira, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 235 days.

(21) Appl. No.: 10/934,185

(22) Filed: Sep. 3, 2004

(51) Int. Cl.
*G03H 1/20* (2006.01)

(52) U.S. Cl. ............................. 359/12; 359/10; 359/35; 430/1

(58) Field of Classification Search .................. 359/10, 359/12, 28, 35; 430/1, 2
See application file for complete search history.

(56) References Cited

U.S. PATENT DOCUMENTS

| | | | | |
|---|---|---|---|---|
| 4,576,434 A | * | 3/1986 | Huignard et al. .............. 359/7 |
| 4,739,496 A | * | 4/1988 | Marom et al. .............. 365/125 |
| 6,621,633 B1 | * | 9/2003 | Barbastathis et al. ........ 359/577 |
| 2002/0191239 A1 | * | 12/2002 | Psaltis et al. .................. 359/26 |

OTHER PUBLICATIONS

A.Sinha and G.Barbastathis, "Resonant holography", Optics Letters, 27(6), pp. 385-387(2002).*

* cited by examiner

*Primary Examiner*—Leonidas Boutsikaris
(74) *Attorney, Agent, or Firm*—Brooks Kushman P.C.

(57) ABSTRACT

A system and method capable of providing high data rate data copying and recording in holographic data storage while maintaining the copied data's signal-to-noise ratio. This is achieved by using optically-based parallel signal processing. In one preferred embodiment, the present invention uses a plurality of optical resonating cavities to provide thresholding and gain functions via positive feedback.

30 Claims, 4 Drawing Sheets

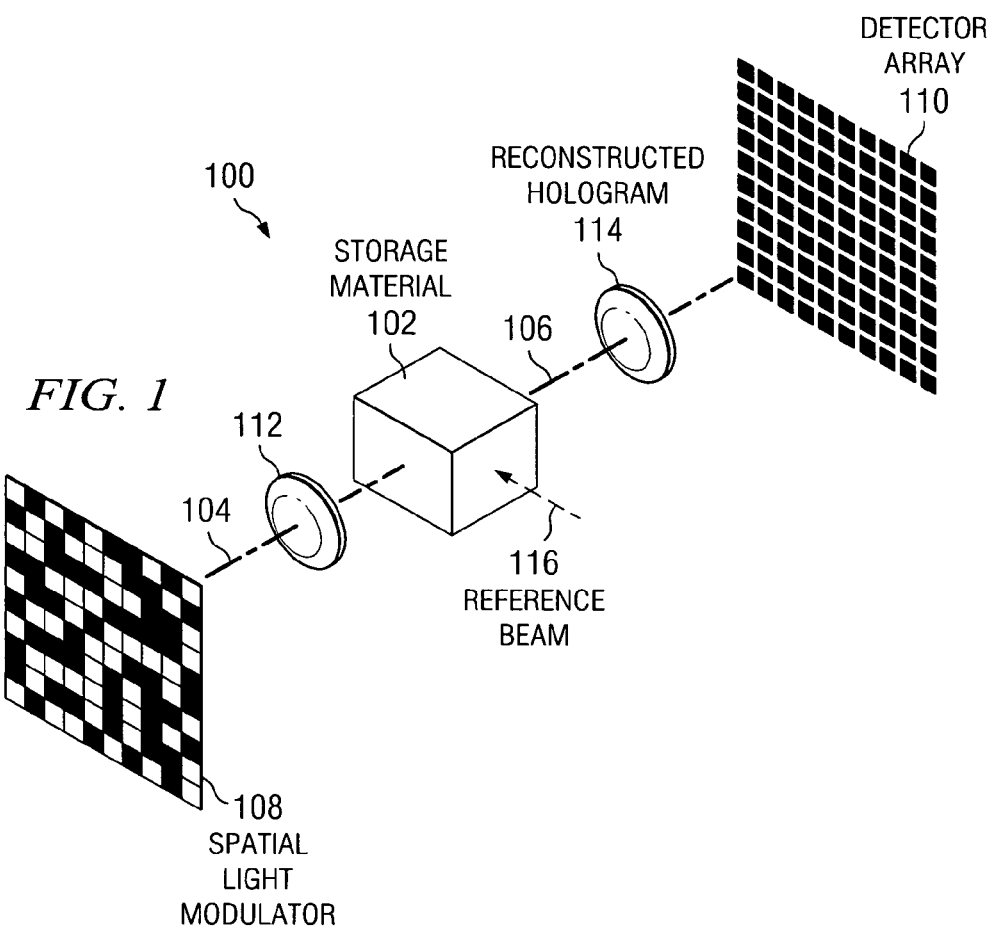
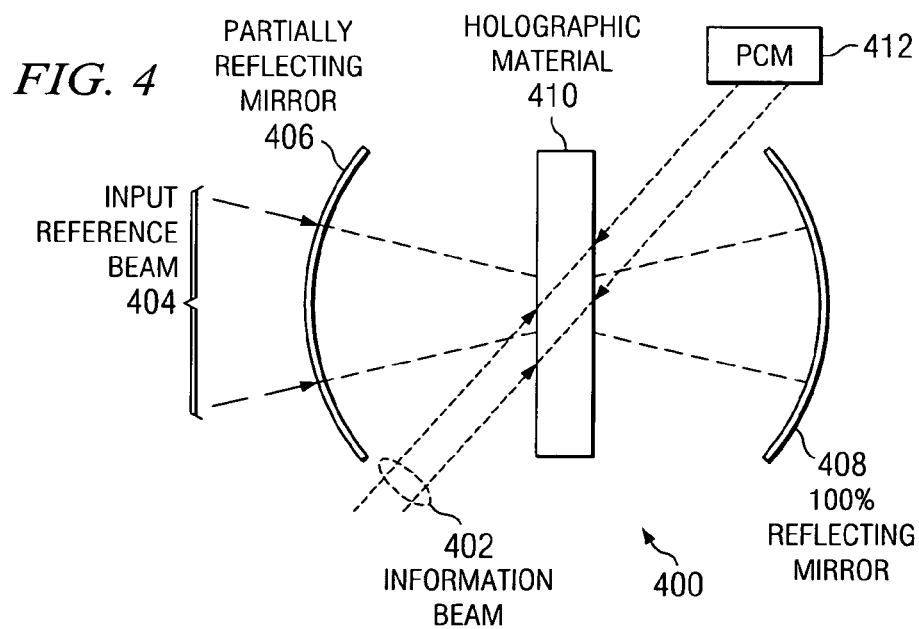

SCHEME CAPABLE OF PROVIDING GAIN AND THRESHOLDING TO THE PARALLEL RECORDING AND REPLICATION OF HOLOGRAPHIC MEDIA

BACKGROUND OF THE INVENTION

1. Field of the Invention

The present invention relates generally to information storage using holographic media, and particularly to parallel recording and replication of holographically stored data.

2. Background of the Invention

Traditionally, high capacity data storage drives/media (e.g., magnetic tape, magnetic disk, optical disk and the like) has presented a scale of growth in data capacity that has outpaced the scale of growth in data transfer rates. Data transfer rate limitations primarily arise from the reading and writing of data in a substantially serial fashion. As a result, the time it takes to access all the data in a medium is exponentially increasing (e.g., in a StorageTek™ 9940 tape, with a capacity of 200 GB, and a data transfer rate of 30 MB/s, the resulting total access time is 1.85 hours).

This presents a significant problem for applications that require substantial copying of the contents of media, such as in the cases of archival duplication (safely storing an archive at an alternate location); system state snapshots (allowing the recovery of a computing system to a previous state); system mirroring (for quick disaster recovery); data distribution (allowing the distribution of a limited number of copies of the media); archive restoration (mass copying of an archive when the media approaches the end of its lifetime), among others.

One implementation of holographic data storage (HDS) provides a data handling advantage by storing data in the form of bit arrays termed "pages." These data pages typically consist of thousands to millions of data bits which are written and/or read in a single step. Furthermore, HDS provides an advantage in storage density by multiplexing several data pages in the same volume of the medium. The optical multiplexing, fortuitously, also allows parallel access to multiple data pages stored in a given medium. Thus, the data can be massively parallel accessed either by illuminating a single location using all reference beams, or by illuminating the entire medium with a given reference beam at a time, the exact addressing method depending on the multiplexing scheme used during recording.

If data could be copied within this highly parallel optical domain, the data rate limitations of today's serial data handling storage devices would be overcome. However, such parallel copy processes would have limitations.

Similar to the process of photocopying paper documents, the copies (and copies of the copies) present a lower signal-to-noise ratio (SNR) than the original. Today's data storage systems provide electronic signal processing (typically by digital processes after an analog to digital conversion of the data has occurred) to maintain the integrity of the data by preserving its SNR. One alternative would be to apply this same type of electronic detection to every HDS bit before recording it optically. This method, however, suffers from the electronic transfer rate limitation described above. What is needed is a system and method to provide signal processing in the optical domain that maintains the HDS data rate performance advantage while also maintaining the SNR of the copied data.

SUMMARY OF THE INVENTION

The present invention uses optically-based signal processing to solve the problem of providing a data copy rate performance advantage through parallel HDS write processes while maintaining the copied data's SNR.

In a preferred embodiment, the present invention provides a system and method for achieving optically-based gain and thresholding during the recording and/or copying process of holographically stored data. In one preferred embodiment, the present invention uses a multiplicity of optical resonating cavities to provide thresholding and gain via positive feedback.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 shows a block diagram depicting a simple holographic storage system of the prior art.

FIG. 4 shows a resonant cavity for providing thresholding and gain in the recording and replication of holographic media.

DETAILED DESCRIPTION OF THE PREFERRED EMBODIMENT

Figure 2:
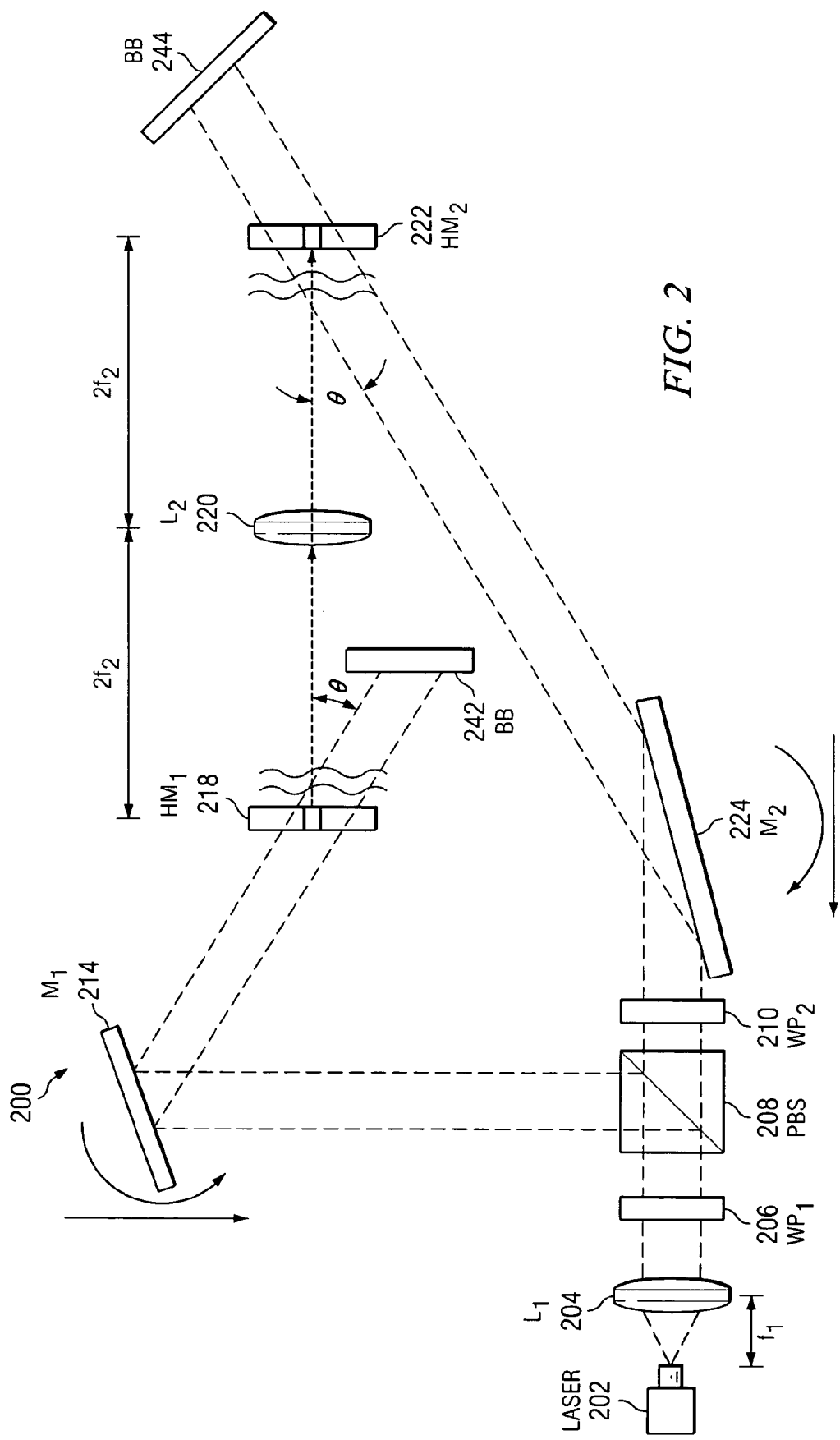
FIG. 2 shows an exemplary optical system capable of performing parallel replication of data from a first holographic medium to a second holographic medium using angular multiplexing.

FIG. 1 shows a block diagram of a prior art holographic system 100 for storing and reconstructing information. To use volume holography for storage, the digital data to be stored in the holographic storage medium 102 is imprinted onto an object beam 104 for recording, then retrieved from the reconstructed object beam 106 during readout. The input device 108 for the system is called a spatial light modulator (SLM). The SLM 108 is, in one embodiment, a planar array containing a multiplicity of pixels, where each pixel is capable of independently modulating light that is transmitted through it or reflected by it (e.g., through phase modulation or amplitude modulation). The output device 110 is a similar array of detector pixels, such as a charge-coupled device (CCD) camera or CMOS APS (active pixel sensor) pixel array. There are also often lenses 112, 114 included in the system to image the SLM pixel array 108 onto the output pixel array 110. Alternately, curved refractive or reflective surfaces may also be used to perform the imaging. In this example, the light from the SLM is the information beam 104, and the reference beam 116 is shown arriving at the storage medium 102 at an angle. Both beams interfere at the holographic medium, capable of recording the resulting interference pattern. The Bragg selectivity of thick holographic media allows multiple holograms to be multiplexed in the same location. This can be done by a multitude of methods, usually accomplished by the variation of the angle or wavelength of the reference beam with respect to the information beam.

The exact method used for the parallel readout of holographically recorded data depends on the multiplexing method used to record the data in the holographic medium. Regardless of the means used to store the information, a preferred embodiment of the present invention includes the use of an optical resonant cavity to provide thresholding and gain via positive feedback during the recording and/or copying process. Thus, implementation of the present invention is independent of the multiplexing method used. However, the applicability of the present invention is easier to understand in the context of an example.

FIG. 2 shows an optical system 200 capable of performing parallel replication of data from a single holographic medium 218 to another holographic medium 222 using angular multiplexing. Lens 204 collimates a beam from laser 202 which is split into two beams by polarizing beam splitter (PBS) 208. First waveplate (WP1) 206 is used to control the variable splitting ratio of the PBS 208 by controlling the polarization of the incident beam. For a laser producing linearly polarized light, for example, WP1 206 could be a half waveplate and the splitting ratio would be controlled by varying the orientation angle of the fast axis of waveplate 206. PBS 208 splits the beam onto an s-polarized reflected arm and a p-polarized straight propagating arm that functions as the reference beam in the holographic copying process. WP2 210 is a half-waveplate oriented at 45 degrees converting the p-polarized beam onto a s-polarized beam, so that both arms of the interferometer are co-polarized. The reflected arm is directed by mirror 214 towards the original holographic medium HM1 218, reading the information recorded on it at a given angle $\theta$. Mirror 214 is also translated in order to compensate for the lateral displacement of the beam at different readout angles, so that the readout beam is always overlapping with HM1 218.

Note that a large section of HM1 218 is illuminated at any given time, meaning that a large number of sites (and a large number of data bits) are simultaneously accessed all the time. The diffracted beams are then imaged towards the replication media (HM2) 222 via a single lens 220. Note that other imaging systems are possible, and the current description is only intended to serve as an example. The straight through arm from PBS 208 is reflected by mirror 224, which is rotated in order to produce the same angle $\theta$ with respect to the diffracted beam at HM2 222, and which is also translated in order to keep the reference beam aligned at HM2 222. The information bearing beam and the reference beam interfere at HM2 222, producing a modulated interference pattern. The replication media records a volume grating between the two beams at angle $\theta$ by changing the index of refraction and/or the absorption of a photosensitive material proportionally to the intensity of the peaks and valleys of the modulated interference pattern produced by interference between the information and reference beams on the material of HM2 222. Beam blocks BB 242 and BB 244 are used to block the undiffracted beams going through the holograms.

The process is repeated over all multiplexed angles for a considerable increase in copying speed relative to electronic detection followed by holographic recording, since multiple sites recorded in the media HM1 218 are accessed simultaneously at every angle without having to undergo electronic processing. The upper bound of the speedup provided by the example of FIG. 2 compared to a page-by-page readout and recording is limited by the ratio between the resolution of the imaging system and the resolution of a single SLM. Assuming enough laser power is available so that the recording time is negligible compared to the time it takes to align the mirrors, the maximum throughput that can be achieved by a page-by-page copy would only be limited by the time it takes the SLM to receive and display new data. For more examples of parallel replication of data recorded holographically, see, for example, the following works which are hereby incorporated by reference: E. Chuang, H. Yamatsu and K. Saito, "Holographic ROM System for High-Speed Replication," *Intern. Symp. on Optical Memory and Optical Data Storage*, pp. 144–146, 2002; E. Chuang, US Patent Application 20030161246, "Holographic Disc Recording System," Sony Corporation, August 2003.

Figure 3:
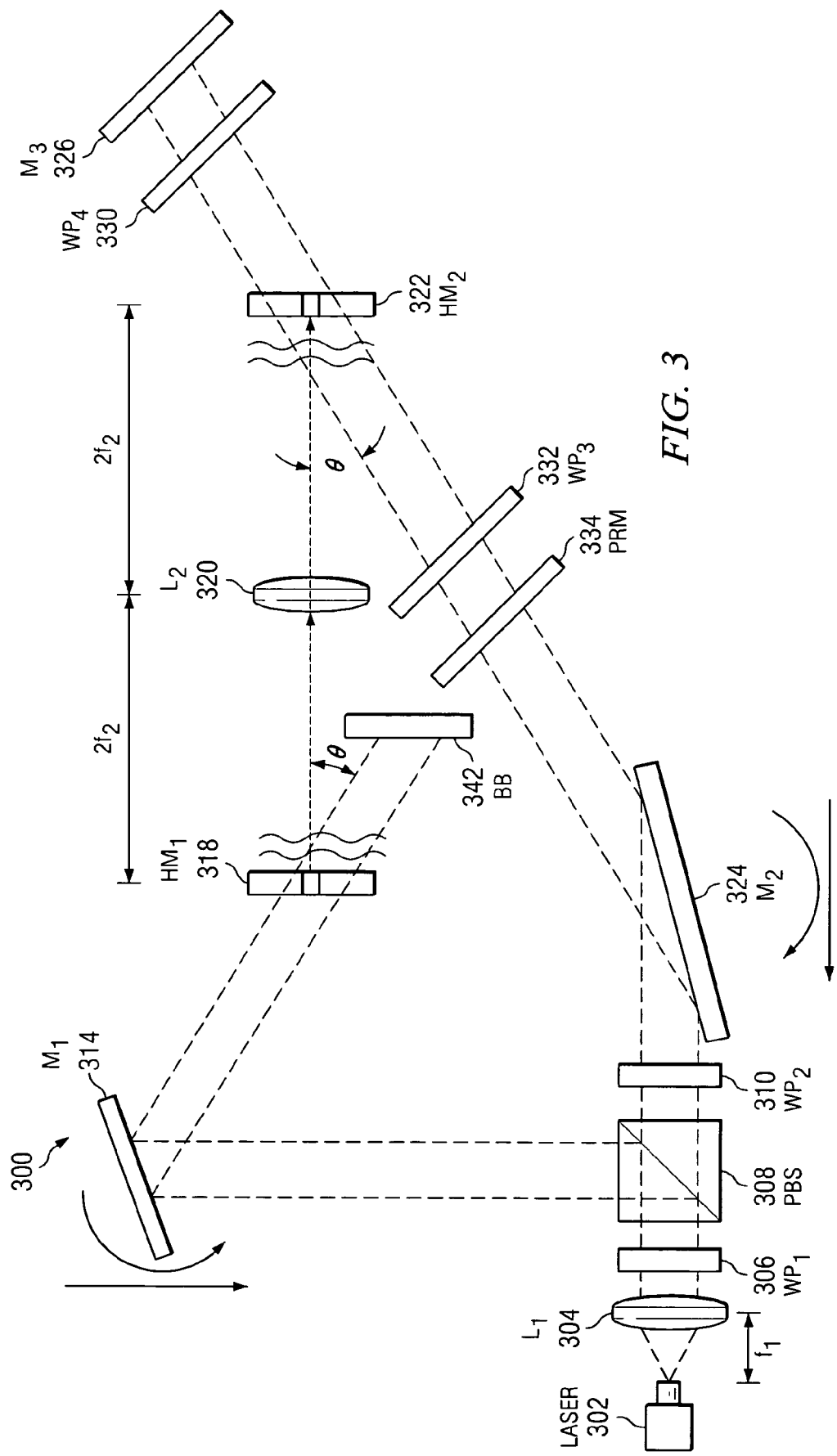
FIG. 3 shows an exemplary optical system of FIG. 2 adapted for being capable of providing thresholding and gain during parallel replication of holographic media, consistent with a preferred embodiment of the present invention.

Though the parallel replication scheme discussed above provides a considerable speedup in copying, it is still inferior to the page-by-page copy in one aspect: the noise added in the process deteriorates the BER, and the deterioration is cumulative with successive copies. In order to overcome this limitation, it is necessary to provide the system with thresholding in order to reconstruct the binary levels of the data. FIG. 3 shows the same replication system as depicted in FIG. 2, with the addition of a partially reflecting mirror (PRM) 334, a 100% reflective mirror (M3) 326, and two waveplates 328, 330 in the reference arm. The two mirrors, 334, 326 form a resonant cavity around the holographic medium, similar to what has been shown in A. Sinha and G. Barbastathis, "Resonant Holography," *Optical Letters*, vol. 27, no. 6, pp. 385–387, 2002, which is hereby incorporated by reference. But in this case it is used for recording a hologram instead of reading it out. The thresholding operates as follows: the information is imaged onto the copy holographic media (HM2) 322 and produces a grating by interfering with the reference beam introduced into the resonant cavity. The grating records an initially weak hologram in the photosensitive media, usually a photopolymer. The weak grating is Bragg matched with the incident information beam, since this is one of the beams used to record it. Thus, when the information beam is diffracted by the grating, it provides us with a diffracted beam coherent with and propagating in the same direction as the reference beam, adding energy to the cavity and providing additional gain to the system. Also, as the media is bleached during exposure, it becomes more transmissive, reducing the loss in the cavity and increasing its Q-factor. This makes more energy available to the cavity, contributing to the holographic recording. This also provides the system with positive feedback, leading to a non-linear increase in the energy in the cavity and to the grating strength, in a process that is similar to what happens in optical bistability (see, for example, R. Boyd, *Nonlinear Optics*, pp. 15–16, 1992, which is hereby incorporated by reference), except that, unlike a saturable absorber, the media becomes permanently bleached and the traditional histeresys curve is replaced by a one-way thresholding curve, as required for the reliable copying of binary data.

It is advantageous to monitor the energy level of the cavity by redirecting a fraction of its power towards a phototector. This can be done, for example, by using a low-reflectance beam splitter tilted with respect to the optical axis. Then, as the energy level of the cavity increases, more optical power can be redirected towards the readout of HM1 318 by adjusting the ratio of energy split between the two outputs of the beam splitter 308. This can be done by adjusting the orientation of WP1 306, and the adjustment should be done in a feedback control loop, having the effect of further speeding up the process of grating accumulation and, consequently, the transfer rate.

Two waveplates 328, 330 are needed when the media responds to both forward and backward propagating reference beams (i.e., transmission and reflection gratings at considerably different center spatial frequencies) in order to prevent both forward and backward propagating beams from recording gratings, thus consuming some of the available dynamic range of the material. The mirrors following the waveplates have the effect of inverting the handedness of the polarization (e.g., right hand circularly polarized light becomes left hand circularly polarized light, and vice versa) such that, once propagating again through the waveplates, light acquires a state of polarization orthogonal to that of the first pass. This has the effect of generating light that has orthogonal polarization states associated with the direction of propagation at HM2 322. By choosing the correct initial polarization states, orientation and retardation of the waveplates it is possible to certify that the reference beam will only be co-polarized with the information beam when it propagates in the desired direction. For example, waveplate 310 could be a quarter waveplate, rendering the reference beam initially right hand circularly polarized; waveplate 328 could be a quarter waveplate oriented at +45 degrees, providing us with a forward propagating beam that would be s-polarized, while waveplate 330 would be another quarter waveplate oriented at −45 degrees, providing us with a backward propagating beam that would be p-polarized, orthogonal with the information beam and, therefore, not producing a recordable interference pattern.

Note that one could also reflect back the transmitted information beam using a phase-conjugate mirror (PCM). This would have the effect of further enhancing the feedback providing thresholding even when the holographic material does not become increasingly transmissive during recording, but at the cost of increased complexity. Finally, note that the thresholding operation provided by the present invention could also be advantageously used in conventional holographic drives during recording, since this invention reduces the time it takes for the recorded hologram to reach a desired diffraction efficiency at a given laser power, thus improving the transfer rate of the drive.

FIG. 4 shows an alternative embodiment of a resonant cavity used for the recording and replication of holographic data with thresholding. It is shown as an alternative embodiment, without suggesting any limitations to the implementation of the present invention. In this example embodiment, information beam 402 originating from an SLM or from the readout of an original hologram (not shown), interferes with a reference beam 404 inside a resonant cavity 400, thus producing the interference pattern necessary for recording a hologram in the holographic material 410. In this embodiment, holographic material 410 is made from a photopolymer. Photopolymers present the property of becoming more transmissive (i.e., more transparent to light) once information is recorded in them. This is a similar property as that observed in saturable absorbers used in bistable optical devices, except that, in the case of the photopolymers, the material is permanently bleached. Note that even if the media did not become increasingly transparent during recording, positive feedback and thresholding could still be achieved by placing a saturable absorber close to an image plane of the media inside the cavity.

The cavity 400 is formed by partially reflecting mirror 406 and 100% reflecting mirror 408. Other mirror setups are also consistent with the present invention, as long as a resonant cavity is formed that reflects light through the holographic medium 410. In a preferred embodiment, the medium has the property of providing the feedback necessary for further bleaching the media and, as the media becomes increasingly transmissive, more positive feedback is provided, further increasing the strength of the reference signal and of the recorded information. Thus, gain is provided by the input reference beam, and thresholding is provided by the positive feedback.

In another embodiment, the transmitted information beam is also reflected back using a phase-conjugate mirror (PCM) 412. This has the effect of further enhancing the feedback, providing the system with thresholding even when the holographic material does not become increasingly transmissive during recording, but at the cost of increased complexity. The PCM could be part of a second resonant cavity, providing the system with a second mechanism for positive feedback.

The implementation of the resonant cavity does not have to be limited to a classic Fabry-Perot resonator, since bistability can take place in any resonant cavity. Thus, in another embodiment the resonant cavity is composed or more than two mirrors forming a ring resonator or, in effect, in a resonant cavity of any kind.

Figure 5:
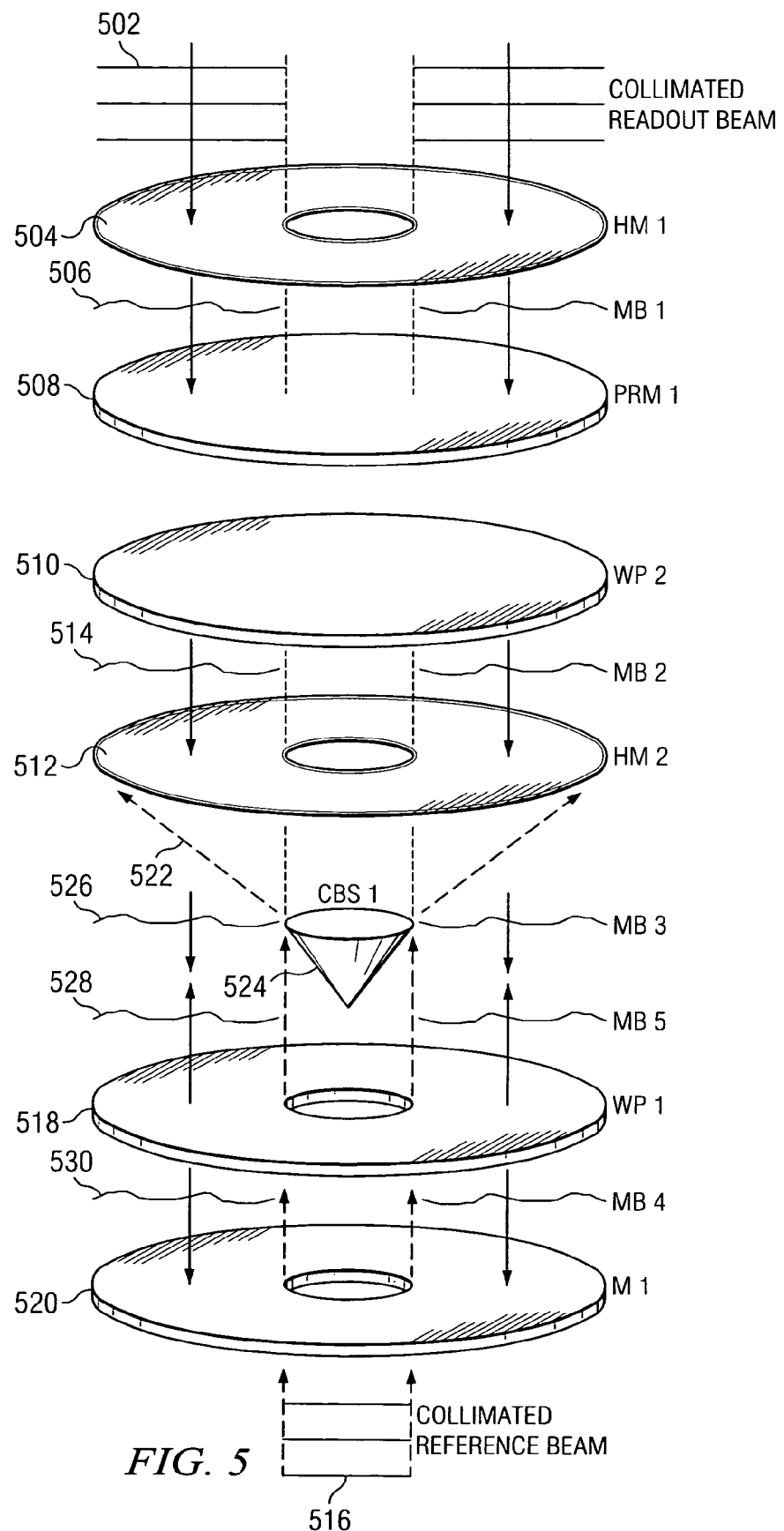
FIG. 5 shows a system wherein thresholding and gain are applied to a previously proposed holographic recording system.

FIG. 5 depicts another embodiment of the present invention, showing how thresholding and gain can be applied to a previously proposed holographic replication system. This is shown as an additional example of how to apply the present invention, without implying a limitation of its application, which could be similarly applied to other existing or future holographic recording and replication systems.

A collimated readout beam 502 is transmitted through and modulated by holographic media 1 (HM 1) 504, producing the modulated beam 1 (MB 1) 506. This beam 506 is first transmitted through a partially reflecting mirror (PRM 1) 508 and then through a waveplate (WP 2) 510 before reaching holographic media 2 (HM 2) 512 as modulated beam 2 (MB 2) 514. The path between MB 1 506 and MB 2 514 should be short enough and the surfaces in between should be flat enough so that MB 2 514 closely resembles MB 1 506, or else imaging and wavefront correction optics would have to be used to make MB 2 514 closely resemble MB 1 506. At HM 2 512, MB 2 514 interferes with the reference beam 522, recording a hologram. The reference beam is initially formed from a collimated beam 516 which is transmitted through a hole in the center of waveplate 1 (WP 1) 518 and highly reflecting mirror 1 (M 1) 520. Then, the collimated beam 516 is shaped by conic beam shaper 1 (CBS 1) 524, here depicted as a conic prism, but which could take any of the shapes described in "Holographic ROM System for High-Speed Replication," referenced above.

The reference beam 522 not only records an initial grating by interfering with MB 2 514, but it also reads out the weakly recorded grating, producing the modulated beam 3 (MB 3) 526, which coherently adds up with the transmitted part of MB 2 514. MB 3 526 is transmitted through WP 1 518 and is reflected back by M 1 520. M 1 520 and PRM 1 508 form the resonant cavity required for feedback. Note that as the grating becomes stronger as the media is bleached, MB 3 526 grows in intensity and the loss in the cavity is reduced, providing us with the positive feedback necessary for thresholding. The waveplates WP 1 518 and WP 2 510 are used in order to control the polarization of the modulated beams in the cavity and, that way, control the direction of the beams that record a grating at HM 2 512. This is done by certifying that the reference beam 522 and MB 2 514 are co-polarized and, simultaneously, orthogonally polarized with respect to MB 5 528. For example, the reference beam 522 could be s-polarized and the readout beam 502 could be right-hand circularly polarized and the waveplates could be quarter waveplates at the wavelength of choice. WP 2 510 would be oriented at +45 degrees in order to convert the right-hand circularly polarized light into s-polarized light. This way, MB 1 506 would become s-polarized after propagation through WP 2 510, making MB 2 514 co-polarized with the reference beam. MB 3 526 (readout by the reference beam) would consequently also be s-polarized, until propagation through WP 1 518, which would be a quarter wave retarder oriented at −45 degrees, and MB 4 530 would become left-hand circularly polarized. Reflection through M 1 520 followed by propagation through WP 1 518 would render MB 5 528 p-polarized and, thus, unable to record a grating neither with the reference beam nor with MB 2 514. However, after propagation through WP 2 510, followed by reflection by PRM 1 508 and propagation through WP 2 510, it would once again be s-polarized, coherently adding with MB 2 514.

Note that the total path length has to be short enough and the optical surfaces flat enough to guarantee that the resonant beams are close replicas of MB 1 506, or else imaging and wavefront correcting optics have to be used. Also, to assure coherent addition of resonant fields in the cavity, the total path length has to be a multiple of the wavelength, as usually required in Fabry-Perot resonators. Finally, HM 1 504 could be replaced with a multiplicity of holographic media, each one recorded at HM 2 512 at an individual reference beam angle by varying the angle provided by CBS 1 524, as explained in "Holographic ROM System for High-Speed Replication," referenced above. This could be done while taking advantage of the thresholding operation just described in the present invention, without loss of generality.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical applications, and to enable others of ordinary skill in the art to understand the invention for various embodiments with various modifications as are suited to the particular use contemplated.

What is claimed is:

1. A method of holographically storing data for parallel replication of holographic media, comprising the steps of:
    illuminating a first holographic material with an information beam and a reference beam, the information beam being generated by reading a second holographic material so as to parallel copy information stored on the second holographic material to the first holographic material;
    circulating at least one of the beams through the first holographic material using at least one resonant cavity.

2. The method of claim 1, wherein holographic information being recorded is originated from a parallel readout of optically modulated data.

3. The method of claim 1, wherein the data is holographically stored during the recording operation of a holographic drive.

4. The method of claim 1, wherein positive feedback in at least one resonant cavity provides an increase in gain and thresholding.

5. The method of claim 4, wherein the positive feedback is provided by at least one optical material inside at least one resonant cavity that becomes more transmissive as the intensity of light incident upon it increases.

6. The method of claim 5, wherein positive feedback is provided by the first holographic material, which becomes more transmissive as information is recorded therein.

7. The method of claim 1, wherein at least one resonant cavity is formed using a first mirror and a second mirror, wherein the first mirror is a partially reflecting mirror, and wherein the second mirror is a substantially 100% reflecting mirror.

8. The method of claim 1, wherein at least one resonant cavity is formed by a ring cavity using multiple mirrors.

9. The method of claim 1, wherein at least one resonant cavity contains a plurality of phase conjugate mirrors.

10. The method of claim 9, wherein at least one of the phase conjugate mirrors provides positive feedback and thresholding even when a saturable absorber is not present in the cavity.

11. The method of claim 1, wherein a combination of polarization controlling optical components within at least one resonant cavity orthogonally polarizes beams propagating in opposite directions.

12. The method of claim 11, wherein the polarization controlling optical components are quarter waveplates.

13. The method of claim 1, wherein at least one resonant cavity is formed by curved refractive mirrors.

14. The method of claim 1, wherein an original holographic media is imaged towards a replicated media using surfaces selected from the group consisting of refractive surfaces, reflective surfaces, and a combination of refractive and reflective surfaces.

15. A method of adjusting optical power distribution in a copy process for parallel replication of holographic media, comprising the steps of:
    monitoring an optical power inside a resonant cavity in which holographic recording occurs on a first holographic material; and
    adjusting fractional power allocated to a reference recording beam and a readout signal beam, the readout signal being generated by reading a second holographic material so as to parallel copy information stored on the second holographic material to the first holographic material.

16. The method of claim 15, wherein the optical power is monitored using a tilted low-reflectance beam splitter, wherein the beam splitter directs a fraction of the optical power in the resonant cavity towards an optical power detector located outside the resonant cavity.

17. The method of claim 15, wherein power is directed away from the reference recording beam and towards the readout signal beam as the resonant cavity gains more power.

18. The method of claim 15, wherein optical power is redirected by varying an orientation angle of a waveplate.

19. A system for storing data using holographic media, comprising:
    a holographic material illuminated by an information beam and a reference beam;
    a plurality of resonant cavities in which holographic recording occurs positioned such that at least one of the reference beam and the information beam passes repeatedly through the holographic material during holographic recording.

20. The system of claim 19, wherein positive feedback in the plurality of resonant cavities provides an increase in gain and thresholding.

21. The system of claim 20, wherein the positive feedback is provided by at least one optical material inside at least one of the plurality of resonant cavities that becomes more transmissive as the intensity of light incident upon it increases.

22. The system of claim 19, wherein positive feedback is provided by the holographic material, which becomes more transmissive as information is recorded therein.

23. The system of claim 19, wherein at least one of the plurality of resonant cavities is formed using a first mirror and a second mirror, wherein the first mirror is a partially reflecting mirror, and wherein the second mirror is a substantially 100% reflecting mirror.

24. The system of claim 19, wherein at least one of the plurality of resonant cavities is a ring cavity formed by multiple mirrors.

25. The system of claim 19, wherein at least one of the plurality of resonant cavities contains a plurality of phase conjugate mirrors.

26. The system of claim 25, wherein at least one of the plurality of phase conjugate mirrors provides positive feedback and thresholding even when a saturable absorber is not present in at least one of the plurality of resonant cavities.

27. The system of claim 19, wherein a plurality of polarization controlling optical components within the plurality of resonant cavities orthogonally polarize beams propagating in opposite directions.

28. The system of claim 27, wherein the polarization controlling optical components are quarter waveplates.

29. The system of claim 19, wherein at least one of the plurality of resonant cavities is formed by a plurality of curved refractive mirrors.

30. The system of claim 19, wherein an original holographic media is imaged towards a replicated media using surfaces selected from the group consisting of refractive surfaces, reflective surfaces, and a combination of refractive and reflective surfaces.

* * * * *